United States Patent [19]
Jobelius

[11] Patent Number: 5,248,131
[45] Date of Patent: Sep. 28, 1993

[54] SPRING DEVICE

[75] Inventor: Klaus-Dieter Jobelius, Boppard, Fed. Rep. of Germany

[73] Assignee: Stabilus GmbH, Kobelnz-Neuendorf, Fed. Rep. of Germany

[21] Appl. No.: 866,757

[22] Filed: Apr. 10, 1992

[30] Foreign Application Priority Data

Apr. 15, 1991 [DE] Fed. Rep. of Germany ....... 4112254

[51] Int. Cl.⁵ .............................................. F16F 9/02
[52] U.S. Cl. ................... 267/64.11; 267/64.25; 267/64.26; 267/120
[58] Field of Search ............... 267/64.11, 64.15, 64.25, 267/64.26, 34, 221, 224, 225, 226, 118, 120, 121; 296/56, 76

[56] References Cited

U.S. PATENT DOCUMENTS

| | | | |
|---|---|---|---|
| 3,963,225 | 6/1976 | Nicholls | 267/64.11 |
| 4,096,785 | 6/1978 | Wirges | 91/416 |
| 4,139,182 | 2/1979 | Nagase et al. | 267/120 |
| 4,474,271 | 10/1984 | Mölders et al. | 188/280 |
| 4,632,371 | 12/1986 | Wirges et al. | 267/64.28 |
| 4,909,488 | 3/1990 | Seibert et al. | 267/64.25 |
| 4,973,097 | 11/1990 | Hosan et al. | 267/120 X |
| 5,040,645 | 8/1991 | Vöpel et al. | 267/120 X |

FOREIGN PATENT DOCUMENTS

| | | |
|---|---|---|
| 2528980 | 1/1977 | Fed. Rep. of Germany . |
| 3120016 | 12/1982 | Fed. Rep. of Germany . |
| 3901256 | 8/1989 | Fed. Rep. of Germany . |
| 3939118A1 | 5/1991 | Fed. Rep. of Germany . |
| 2001287 | 9/1969 | France ............................ 267/64.15 |
| 0083633 | 7/1981 | Japan .............................. 267/34 |
| 2036247 | 6/1980 | United Kingdom . |
| 2065827 | 7/1981 | United Kingdom ........... 267/120 |

*Primary Examiner*—Robert J. Oberleitner
*Assistant Examiner*—Peter M. Poon
*Attorney, Agent, or Firm*—Brumbaugh, Graves, Donohue & Raymond

[57] ABSTRACT

A gas spring comprises a cylinder and a piston rod. The piston rod extends through a first end wall of the cylinder in axial direction of the cylinder. A volume of pressurized gas is contained within a cavity defined within the cylinder. The pressurized gas exerts an expelling force onto the piston rod. A sliding tube is slidingly guided on the cylinder. This guiding tube has a bottom wall engageable with a second end wall of the cylinder. The tube is provided with a guiding ring at its end remote from its bottom wall. The guiding ring is slidably guided on the piston rod. A helical compression spring is axially compressable between the first end wall of the cylinder and the guiding ring. One fastening eye is provided at an outer end of the piston rod. A further fastening eye is provided at the bottom wall of the tube.

22 Claims, 4 Drawing Sheets

SPRING DEVICE

BACKGROUND OF THE INVENTION

This invention relates to a unit and more particularly to a gas spring unit. Gas spring units are frequently used e.g. in motor-vehicle constructions for facilitating the movement of a movable part, such as a trunk lid or an engine hood between a closed position and an open position Moreover, it is possible to use such gas spring units for facilitating the movement of a movable roof element of a motor-vehicle construction with respect to the basic framework of such a motor-vehicle construction. More particularly, gas spring units as considered by the present invention may be used for facilitating the movement of a roof element, such as a foldable roof element with a cabriolet. In such a cabriolet, it may occur that the roof element is loaded by gravity forces towards an opening position within a first range of movement adjacent said opening position and that the roof element is also load by gravity forces towards a closing position within a second range of movement. In a third range of movement between said first range of movement and said second range of movement, the gravity forces may be compensated for by guiding forces so that no substantial gravity forces act onto the foldable roof element towards the opening or the closing position. In such a situation, it may be desirable to use a spring device for facilitating the movement of the foldable roof element between the opening position and the closing position. When using such a spring device for facilitating said movement, specific characteristics are desirable for the spring device. Such, the spring device should support the movement of the foldable roof element through the first range of movement away from the closing position. On the other hand, it is not desirable at all that the foldable roof element is accelerated by gravity forces when being moved through the second range of movement, i.e. when approaching the closing position.

STATEMENT OF THE PRIOR ART

From British patent publication GB 20 36 247 a spring device is known which comprises a conventional gas spring, such as frequently used for facilitating the opening movement of a trunk lid or an engine hood in a motor-vehicle. A prolongation tube is axially guided on the cylinder of the gas spring. This prolongation tube has a bottom wall adjacent a bottom wall of the cylinder. A first fastening eye is provided on the bottom wall of the prolongation tube and a second fastening eye is provided on the outer end of the piston rod. A helical compression spring is provided between the bottom wall of the cylinder and the bottom wall of the prolongation tube. So the prolongation tube is biased towards a prolongation position with respect to the cylinder.

When using such a spring device as shown in British publication GB 20 36 247A with a cabriolet, the spring device would be able to facilitate the movement of the foldable roof element through the above-mentioned first range of movement away from the opening position. When, however, the foldable roof element approaches the closing position, i.e. moves through the second range of movement towards said closing position, the spring device would still try to accelerate the roof element towards the closing position in addition to the gravity forces, which also try to accelerate the roof element towards the closing position. This might result in the foldable roof element to hit with a too high velocity against abutment means defining the closed position of the foldable roof element. Moreover, when opening the foldable roof element again, i.e. when moving the foldable roof element through the second range of movement towards the opening position, the operator must overcome not only gravitational forces but also forces resulting from the spring device.

OBJECT OF THE INVENTION

It is a primary object of the present invention to provide a spring device having specific characteristics: these characteristics should be as follows: when lengthening the spring device from its shortest length towards its longest length in a first range of lengthening adjacent to the shortest length, an expansion force should be provided by the spring device. In a second range of lengthening of the spring device adjacent to the longest length, a retracting force should be provided by the spring device.

A further object of the present invention is to obtain characteristics according to which in a third range of movement between said first range of movement and said second range of movement the spring device has a substantially neutral behaviour, i.e. provides neither an expansion force nor a retraction force.

Still a further object of the invention is to provide a spring device which can be adapted to various desirable characteristics and has a most compact design.

Still a further object of the present invention is to provide a spring device which can be composed of easily obtainable components.

SUMMARY OF THE INVENTION

A spring device comprises a fluid spring unit. This fluid spring unit has a cylinder member with an axis, two ends and a cavity within the cylinder member. A piston rod member extends inwards and outwards of the cavity through an exit side end of the cylinder member along the axis of the cylinder member. The piston rod member is axially movable with respect to the cylinder member between an innermost position and an outermost position with respect to the acting onto said piston rod member (10b), said spring cylinder member. A fluid under pressure and more preferably a pressurized gas is provided within the cavity. This fluid exerts an outwards directed expelling force onto the piston rod member with respect to the cylinder member.

The spring device further comprises at least one slide member axially guided along the axis of the cylinder member and axially movable with respect to a first one of the cylinder member and the piston rod member, when the piston rod member is in its outermost position. A first fastening element is connected to the slide member, and a second fastening element is connected to a second one of the cylinder member and the piston rod member. The fastening elements have an axial distance defining an effective length of the spring device. The slide member is axially movable with respect to said first one the cylinder member and the piston rod member between an effective length shortening position and an effective length prolongating position. Biasing means are provided for biasing the slide member towards said effective length shortening position.

Such a spring device has the above required specific characteristics: when the piston rod member is in its most inward position with respect to the cylinder member, and the slide member is in its effective length shortening position, the total effective length of the spring device is shortest. A first range of lengthening is obtained by the piston rod member moving from its innermost position to its outermost position. During this first range of movement the spring device provides an expansion force. A further lengthening is only possible by exerting a lengthening force onto the fastening elements. Under the action of such a lengthening force, the slide element is moved from its effective length shortening position towards its effective length prolongating position with respect to the respective one of said piston rod member and said cylinder member. Thus, the total effective length of the spring device is extended up to its longest position. This corresponds to a second range of lengthening. During this second range of lengthening, the biasing means exerts a retraction force onto said slide member.

If it is desirable that the spring device behaves neutrally in a third range of lengthening between said first range of lengthening and said second range of lengthening, the slide member may be biased towards said effective length shortening position only along a partial path of movement between said effective length shortening position and said effective length prolongating position, said partial path being adjacent said effective length prolongating position, said slide member being substantially freely movable through a remaining path of movement.

The slide member may comprise a tube member axially guided on at least one of the cylinder member and the piston rod member. Thus, the spring device may be composed substantially of a usual gas spring and an easily available tube member.

The slide member may be axially guided on the piston rod member outside the cylinder member. This is an embodiment which provides a relatively long effective length of the spring device. More particularly, the slide member may be guided on the piston rod member by a tube member surrounding the piston rod member and a helical compression spring acting as biasing means may be provided within an annular space defined radially between the piston rod member and the tube member.

According to an alternative embodiment, the slide member may be axially guided on the cylinder member. In this embodiment, the cylinder member and the slide member may be provided with a first group of axial abutment means defining the effective length shortening position. Further, the biasing means may be provided axially between an abutment face of the cylinder member adjacent the exit side end of the cylinder member and a support member provided on the slide member. In order to obtain a most compact structure, the biasing means may be located such as to surround the piston rod member outside the cylinder member. Also in this embodiment, the slide member comprises preferably a tube member. This tube member may have a bottom wall and this bottom wall may cooperate with an exit far end of the cylinder member, such as to define the above-mentioned abutment means. In such a construction, the tube member may have a first section slidingly guided on the cylinder member and a second section surrounding the piston rod member outside the cylinder member. The support member may comprise a ring member surrounding the piston rod member and connected to the second section. The biasing means may then be located axially between the ring member and the exit side end of the cylinder member. The biasing means may also in this embodiment comprise a helical compression spring. This helical compression spring may have an axial length smaller than the axial distance between the exit side end of the cylinder member and the ring member, when said exit far end of said cylinder member is in abutting engagement with the bottom wall of the tube member. This second embodiment is again characterized by a relative long effective length and on the other hand, by a relatively slim overall dimensioning.

Instead of a helical compression spring the biasing means may also comprise a volume of pressurized gas which can be located radially between the piston rod member and the second section of the cylinder member. This volume of pressurized gas may be axially confined by first sealing ring means adjacent the exit side end of the cylinder member and by second sealing ring means connected to the second section of the tube member and more remote from the cylinder member. In such case, the piston rod member is sealingly guided through both the first and the second sealing ring means. The first sealing ring means may be axially entrainable by the exit side end of the cylinder member towards said second sealing ring means against the biasing action of the volume of pressurized gas.

In order to obtain the above-mentioned neutral behaviour of the spring device at an intermediate length thereof, the first sealing ring means may be axially locatable by axial locating means in a rest position such that—when said first sealing ring means are in the rest position, they are axially spaced from the exit side end of the cylinder member, when the cylinder member is in abutting engagement by its exit far end with the bottom wall of the tube member.

In order to obtain a strong biasing action of the volume of pressurized gas, the second section of the tube member may have a diameter larger than the first section of the tube member. In such a design, a shoulder-shaped transient section occurs between the first section and the second section, and this shoulder-shaped transient section may act as the above-mentioned locating means. Preferably, the first sealing ring means are movable with respect to the second section against a smaller frictional resistance than with respect to the piston rod member. By this one makes sure that said first sealing ring means are always located by said locating means, when said tube member is in said effective length shortening position with respect to said cylinder member.

If one looks for a spring device having a minimum effective length both in the maximum effective length condition and in the minimum effective length condition, it is desirable to locate the biasing means substantially along the axial length of the cylinder member. Also in such a construction, the slide member may again be a tube member having a circumferential wall surrounding the cylinder member and a bottom wall adjacent an exit far end of the cylinder member. The biasing means may then be located radially between the cylinder member and the circumferential wall of the tube member. The biasing means may again comprise a helical compression spring supported by a first one of its ends through first annular support means connected to said circumferential wall of said tube member adjacent said exit side end of the cylinder member. On the other hand, a second end of the helical compression spring may be supported through second annular support means connected to the cylinder member adjacent the exit far end thereof. The tube member may be slidingly guided on the cylinder member by at least one of the first and second annular support means.

According to a further aspect of the present invention, a spring device comprises a fluid spring unit and more particularly a gas spring unit. The fluid spring unit has a cylinder member with an axis, two ends and a cavity within the cylinder member. A piston rod member extends inwards and outwards of the cavity through an exit side end of the cylinder member along said axis. The piston rod member is axially movable with respect to the cylinder member between an innermost position and an outermost position with respect to the cylinder member. A fluid under pressure, preferably a pressurized gas, is provided within the cavity. The fluid exerts an outwards directed expelling force onto the piston rod member with respect to the cylinder member. The spring device further comprises a tube member slidingly guided along the cylinder member. The tube member has a bottom wall adjacent an exit far end of the cylinder member and an annular piston rod guiding means guidingly surrounding the piston rod member outside the cylinder member. The cylinder member is axially movable within the tube member. Biasing means may be provided anywhere within the tube member. These biasing means bias the cylinder member within the tube member towards a terminal relative position of said cylinder member and said tube member. This embodiment may be used not only in cases in which the above defined desirable characteristics are obtained. It may be rather used also for an embodiment according to the design principles of the spring device according to FIG. 2 of the above discussed British patent publication GB 20 36 247A. Such a most compact spring device is obtained, in which the total structure is enclosed within the tube member except for the outer end of the piston rod member and the fastening elements.

According to a further aspect of the present invention, a spring device having the above described desirable characteristics is combined with a mechanical structure. The mechanical structure comprises a basic structural unit and a movable structural unit which is connected to the basic structural unit. The movable structural unit is movable along a path of movement between a first terminal position and a second terminal position with respect to the basic structural unit. The movable structural unit is subject to gravity forces within a first section of said path of movement nearer to said first terminal position and within a second section of said path of movement nearer to said second terminal position. The gravity forces urge the movable structural unit towards the first terminal position within the first section of said path of movement and towards said second terminal position within said second section of said path of movement. The spring device is connected by its fastening elements to both said basic structural unit and said movable structural unit. The spring device supports movement of said movable structural unit away from said first terminal position within said first section against the action of said gravity forces due to the expelling action of the pressurized fluid acting onto the piston rod member. On the other hand, the spring device resists to said gravity forces within said second section of said path of movement through a biasing action of said biasing means.

The basic structural unit may be e.g. a framework of a motor-vehicle construction and the movable structural unit may be a roof unit of the motor-vehicle construction.

If the mechanical structure is such that in an intermediate or third range of movement of the movable structural unit no substantial vertical displacement of the center of gravity of the movable structural unit occurs, it may be desirable to make the spring device neutral within a range of lengthening corresponding to said third range of movement of the movable structural unit.

It may be desirable in all embodiments to provide biasing means which are under prestress even in said effective length shortening position.

The various features of novelty which characterize the invention are pointed out with particularity in the claims annexed to and forming a part of the disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

The invention will be explained in greater detail hereafter with reference to embodiments shown in the accompanying drawings in which.

DETAILED DESCRIPTION OF THE PREFERRED EMBODIMENTS

Figure 1:
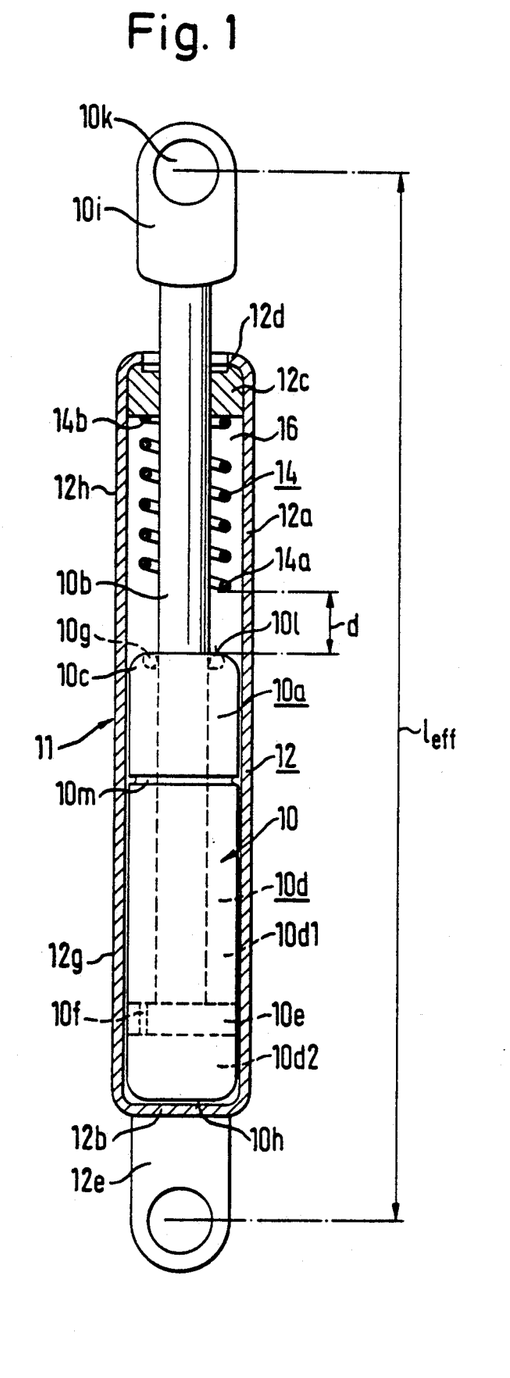
FIG. 1 shows a first embodiment of a spring device.

According to FIG. 1, a spring device 11 comprises a conventional gas spring 10. This conventional gas spring comprises a cylinder 10a and a piston rod 10b. The piston rod 10b extends through an upper or exit side end 10c of the cylinder and is connected within the cavity 10d of the cylinder with a piston unit 10e. The cavity 10d is subdivided by the piston unit into two working chambers 10d1 and 10d2. The working chambers 10d1 and 10d2 are interconnected by a bore 10f. The working chambers 10d1 and 10d2 are filled with a pressurized gas. The piston rod 10b is guided at the exit side end 10c through a guiding and sealing unit diagrammatically illustrated by an O-ring 10g. The lower end of the cylinder member 10a is defined by a bottom wall or exit far end wall 10h.

The outer end of the piston rod 10b is provided with a fastening element 10i. This fastening element 10i is provided with a cylindrical bore 10k permitting pivotal connection of the piston rod 10b with a structural part of a mechanical structure including the spring device.

The spring device 11 of FIG. 1 further comprises a tube 12. This tube 12 has a circumferential wall 12a and a bottom wall 12b. The piston rod 10b is guided through a guiding ring 12c at the upper end of the tube 12. The guiding ring 12c is axially fixed with respect to the tube 12 by a radially inwardly crimped end portion 12d of the tube 12. The cylinder 10 is axially slidably guided within the tube 12. In the position as shown in FIG. 1, the bottom wall 10h of the cylinder 10 is in abutting engagement with the bottom wall 12b of the tube 12. A fastening element 12e is fixed to the bottom wall 12b of the tube 12. The fastening element 12e is of similar design as the fastening element 10i discussed above. This fastening element 12e is adapted to be pivotally connected to a further structural member of a mechanical structure including the spring device of FIG. 1.

A helical compression spring 14 is provided in the annular space 16 defined radially between the piston rod 10b and the tube 12. The axial length of the helical compression spring 14 is shorter than the axial distance between the guiding ring 12c and the exit side end face 101 of the cylinder 10a. The difference in axial length corresponds to the distance d as shown in FIG. 1.

The piston rod 10b is subject to an expelling force exerted by the pressurized gas within the cavity 10d onto the cross-sectional area of the piston rod 10b. The piston rod 10b is expellable by said expelling force in upward direction out of the cylinder 10a, until the piston rod 10b arrives in an outermost position defined by abutting engagement of the piston unit 10e and an annular deformation 10m provided in the cylinder 10a. The innermost position of the piston rod 10b with respect to the cylinder 10a is defined by abutting engagement of the piston unit 10e and the bottom wall 10h of the cylinder 10a. Alternatively, the innermost position of the piston rod 10b may also be defined by abutting engagement of the fastening element 10i and the inward crimped portion 12d of the tube 12, when the bottom wall 10h of the cylinder 10a is in abutting engagement with the bottom wall 12b of the tube 12.

After the piston rod 10b has arrived in its axially outermost position with respect to the cylinder 10a, the effective length $l_{eff}$ may be further increased by withdrawing the gas spring 10 in axially upward direction as seen in FIG. 1 with respect to the tube 12. This upward movement of the gas spring 10a is not substantially resisted before the upper end face 101 engages the lower end 14a of the helical compression spring 14 and the upper end 14b of the helical compression spring 14 engages the guiding ring 12c. Further retraction of the gas spring 10 in upward direction with respect to the tube 12 results in a compression of the helical compression spring 14 between the upper end face 101 and the guiding ring 12c. The gas spring 10 is of conventional design with the only exception that the fastening element 12e is connected to the tube 12, whereas in conventional designs the fastening element 12e is frequently directly connected to the bottom wall 10h of the cylinder 10a. The lower section of the tube 12 is designated by 12g and the upper section is designated by 12h. The spring device 11 of FIG. 1 may be used in connection with a foldable roof element of a cabriolet as shown in FIG. 5.

Figure 5:
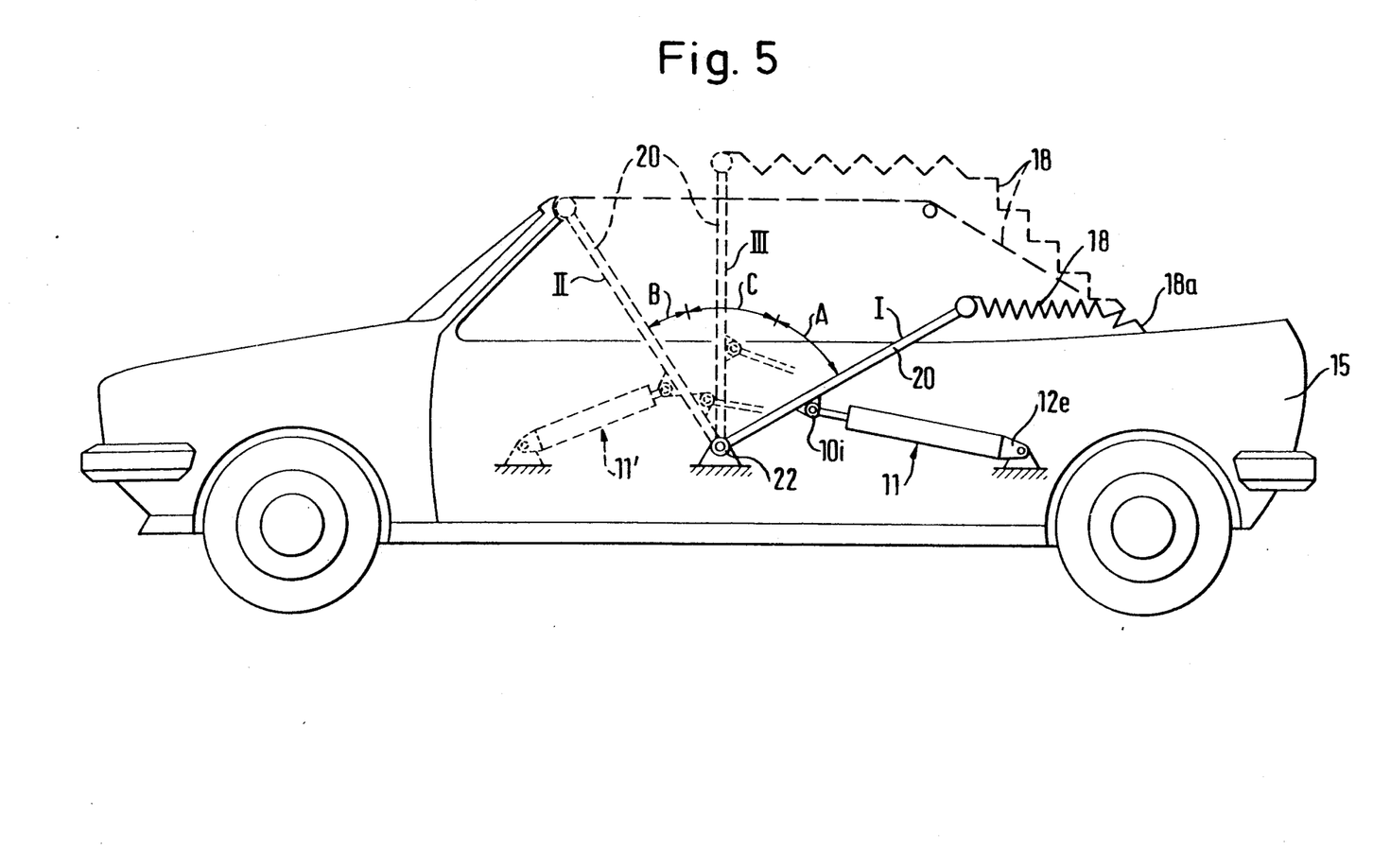
FIG. 5 shows a spring device according to FIG. 1 in combination with a foldable roof element of a cabriolet.

In FIG. 5, the basic framework of the cabriolet type motor-vehicle is designated by 15. The foldable roof element of the cabriolet is designated by 18 and is connected with its rearward end 18a to the basic framework 15. The forward end of the foldable roof element 18 is connected to a U-shaped pivot member 20. This U-shaped pivot member 20 is pivotally connected at 22 to the framework 15. The pivot member 20 is pivotally movable between an opening position as shown at I in FIG. 5 through an intermediate position as shown at III of FIG. 5 to a closing position as shown at II in FIG. 5.

The pivot member 20 is movable through a first range of movement A, a second range of movement B and a third or intermediate range of movement C. Within the first range of movement A the pivot member 20 is urged by gravity forces towards the opening position I. Within the second range of movement B the pivot member 20 is urged by gravity forces towards the closing position II. Within the third or intermediate range of movement C, there is substantially no torque exerted by gravity forces onto the pivot member 20.

The spring device 11 as shown in FIG. 1 is connected by the fastening element 12e to the body work 15 of the motor-vehicle and by the fastening element 10i to the pivot member 20. Movement of the pivot member 20 from the position I through the range of movement A is supported by the expelling force of the pressurized gas acting onto the piston rod 10b. When the pivot member 20 has arrived at the left-hand end of the range of movement A, the piston unit 10e has abuttingly engaged the annular deformation 10m of the cylinder 10a. The pivot member 20 may hereupon be moved through the range of movement C without said movement being supported by the spring device. During the movement of the pivot member 20 through the range of movement C, the cylinder 10a approaches the end 14a of the helical compression spring 14.

During further movement of the pivot member 20 through the range of movement B towards the closing position II, the helical compression spring 14 is compressed between the upper end face 101 and the guiding ring 12c. Thus, the downward movement of the pivot member 20 throught the range of movement B towards the closing position II is braked by the helical compression spring 14 being compressed.

When the pivot member 20 is returned towards the position III again, the helical compression spring 14 can expand and supports the movement of the pivot member 20 through the range of movement B. Such, the operator can easily move the folding roof element 18 in both directions between the closing position II and the opening position I.

Figure 2:
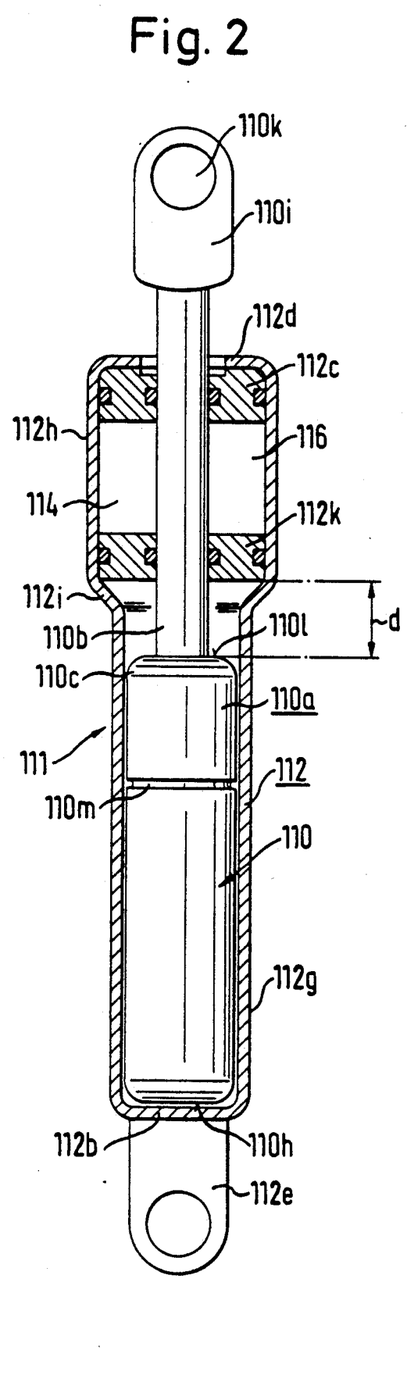
FIG. 2 shows a second embodiment of the spring device.

FIG. 2 shows a second embodiment which is basically similar to the embodiment of FIG. 1. Analogous parts are designated by the same reference numerals as in FIG. 1 increased by 100.

In the embodiment of FIG. 2, the helical compression spring 14 has been replaced by pneumatic biasing means. The tube 112 has a lower section 112g and an upper section 112h. The upper section 112h is connected with the lower section 112g through a shoulder-shaped transient section 112i. A volume of pressurized gas is contained within the annular space 116. The annular space 116 is sealed in upwards direction by a sealing ring 112c and in downward direction by a sealing ring 112k. The sealing ring 112c is axially fixed with respect to the upper section 112h of the tube 112, whereas the sealing ring 112k is axially movable with respect to this upper section 112h, its downward movement being limited by engagement with the transient section 112i. When the spring device 111 is subject to a retraction force after the piston rod 110b has arrived at its outermost position, the cylinder is freely movable through the distance d, until the upper end face 1101 enters into abutting engagement with the sealing ring 112k. On further extraction movement, the sealing ring 112k is entrained in upwards direction by the upper end face 1101 against the resistance of the pressurized gas, which is further compressed between the sealing rings 112c and 112k. Such, the behaviour of the spring device of FIG. 2 is substantially identical to the behaviour of the spring device of FIG. 1. It is easily understandable that also in FIG. 1, the helical compression spring may be prestressed already before the upper end face 101 engages the lower end 14a of the helical compression spring 14. The spring device of FIG. 2 may also be used in connection with the mechanical structure in FIG. 5.

Figure 3:
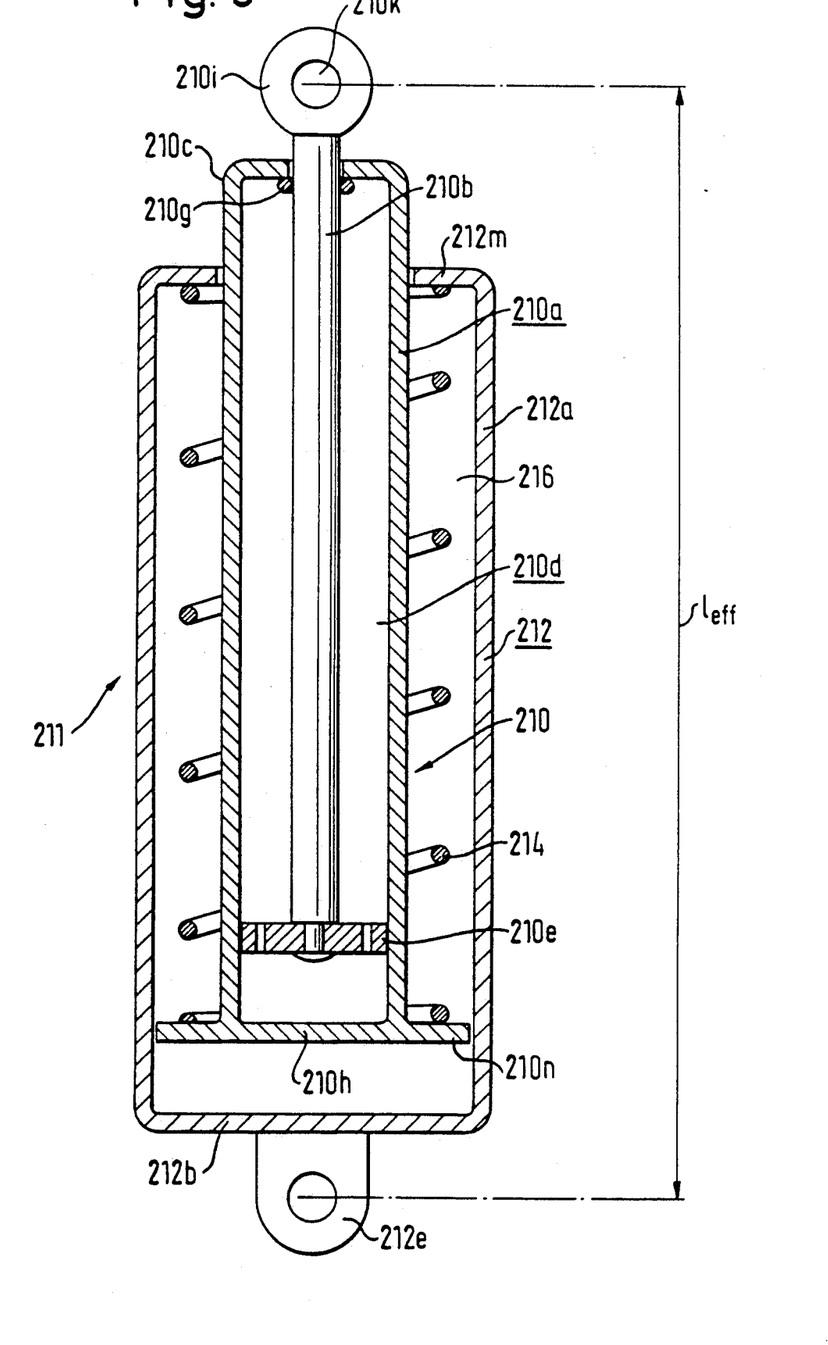
FIG. 3 shows a third embodiment of the spring device.

In the embodiment of FIG. 3, analogous components are designated by the same reference numerals as in FIG. 1 increased by 200. In this embodiment, the cylinder 210a of the gas spring 210 is guided within a tube 212 by a radially inwards directed support flange 212m of the tube 212 and by a radially outwards directed support flange 210n of the cylinder 210a. A helical compression spring 214 is accommodated within an annular space 216 axially between the support flanges 212m and 210n.

The piston rod 210b is again axially biased by the pressurized gas within the cavity 210d. After the piston rod 210b has been expelled by the pressurized gas until abutting engagement of the piston unit 210e with the sealing and guiding unit 210g, the effective length of the spring device 211 may be further increased by exerting an extraction force onto the fastening elements 210i and 212e. Such, the helical compression spring 214 is axially compressed between the support flanges 212m and 210n.

The embodiment of FIG. 3 is larger in diameter than the embodiment shown in FIG. 1. The axial length of the device of FIG. 3 may be, however, considerable shorter than the length of the embodiment of FIG. 1 at identical length variation between the minimum effective length and the maximum effective length.

Figure 4:
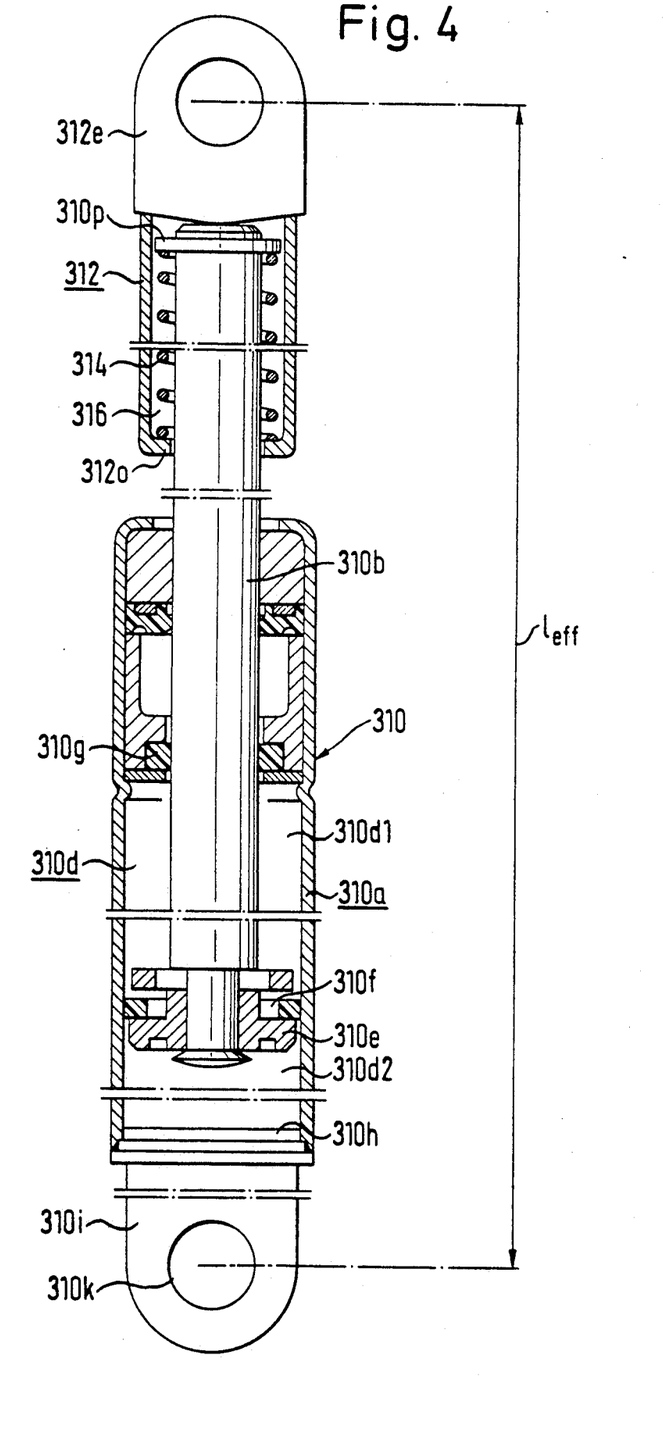
FIG. 4 shows a fourth embodiment of the spring device.

In the embodiment of FIG. 4, analogous parts are designated by the same reference numerals as in FIG. 1 increased by 300. In this embodiment, the fastening element 310i is directly mounted to the bottom wall 310h of the cylinder 310a. On the other hand, the fastening element 312e is axiall movably mounted on the outer portion of the piston rod 310b by a sliding tube 312. The sliding tube 312 is axially guided on the piston rod 310b by a radially inwardly directed flange 312o of the tube 312 and by a radially outwardly directed flange 310p of the piston rod 310b. A helical compression spring 314 is accommodated within a radial space 316 between the piston rod 310b and the tube 312. This helical compression spring 314 is axially compressable between the flanges 312o and 310p.

After the piston rod 310b has arrived in its outermost position defined by abutting engagement of the piston unit 310e and the guiding and sealing unit 310g under the expelling action of the pressurized gas within the cavity 310d, the effective length left can be further increased by a lengthening force acting onto the fastening elements 312e and 310i with the tube 312 being axially moved upwards with respect to the piston rod 310b under further compression of the helical compression spring 314. So, the behaviour of the spring device of FIG. 4 is again very similar to the behaviour of the embodiment as shown in FIG. 1. The embodiment of FIG. 4 can also be used in a motor-vehicle construction as shown in FIG. 5.

It is readily to be understood that in the construction as shown in FIG. 5 the spring device can also be arranged such as shown in dotted lines in FIG. 5 at 11'.

Returning now to the embodiment of FIG. 1, this has the further advantage that—as long as the spring device is subject to compressive force between the fastening elements 10i and 12e—the effective guiding length for the piston rod 10b is increased by the tube 12 and the guiding ring 12c.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

I claim:

1. A spring device comprising a fluid spring unit (10), said fluid spring unit (10) having a cylinder member (10a) with an axis, two ends (10c,10h) and a cavity (10d) within said cylinder member (10a), a piston rod member (10b) extending inwards and outwards of said cavity (10d) through an exit side end (10c) of said cylinder member (10a) along said axis, said piston rod member (10b) being axially movable with respect to said cylinder member (10a) between an innermost position and an outermost position with respect to said cylinder member (10a), a fluid under pressure within said cavity (10d), said fluid exerting an outwards directed expelling force onto said piston rod member (10b) with respect to said cylinder member (10a), said spring device further comprising at leaset one slide member (12) axially guided along said axis and axially movable with respect to a first one (10a) of said cylinder member (10a) and said piston rod member (10b), when said piston rod member (10b) is in said outermost position, a first fastening element (12e) connected to said slide member(12) and a second fastening element (10i) connected to a second one (10b) of said cylinder member (10a) and said piston rod member (10b), said fastening elements (12e,10i) having an axial distance defining an effective length of said spring device (11), said slide member (12) being axially movable with respect to said first (10a) one of said cylinder member (10a) and said piston rod member (10b) between an effective length shortening position and an effective length prolongating position, biasing means (14) being provided for biasing said slide member (12) towards said effective length shortening position.

2. A spring device as set forth in claim 1, said slide member (12) being biased towards said effective length shortening position only along a partial path of movement between said effective length shortening position and said effective length prolongating position, said partial path being adjacent said effective length prolongating position, said slide member (12) being substantially freely movable through a remaining path of movement (d).

3. A spring device as set forth in claim 1, said slide member (12) comprising a tube member (12) axially guided on at least one (10a) of said cylinder member (10a) and said piston rod member (10b).

4. A spring device as set forth in claim 1, said slide member (312) being axially guided on said piston rod member (310b) outside said cylinder member (310a).

5. A spring device as set forth in claim 4, said slide member (312) being guided on said piston rod member (310b) by a tube member (312) surrounding said piston rod member (310b), a helical compression spring (314) acting as said biasing means being provided within an annular space (316) defined radially between said piston rod member (310b) and said tube member (312).

6. A spring device as set forth in claim 1, said slide member (12) being axially guided on said cylinder member (10a), said cylinder member (10a) and said slide member (12) being provided with a first group of axial abutment means (10h,12b) defining said effective length shortening position, said biasing means (14) being provided axially between an abutment face (101) allocated to cylinder member (10a) adjacent said exit side end (10c) of said cylinder member (10a) and a support member (12c) provided on said slide member (12).

7. A spring device as set forth in claim 6, said biasing means (14) surrounding said piston rod member (10b) outside said cylinder member (10a).

8. A spring device as set forth in claim 7, said slide member (12) comprising a tube member (12), said tube member (12) having a bottom wall (12b), said bottom wall (12b) cooperating with an exit far end (10h) of said cylinder member (10a), such as to define said abutment means, said tube member (12) having a first section (12g) slidingly guided on said cylinder member (10a) and a second section (12h) surrounding said piston rod member (10b) outside said cylinder member (10a), said support member (12c) comprising a ring member (12c) surrounding said piston rod member (10b) and connected to said second section (12h), said biasing means (14) being located axially between said ring member (12c) and said exit side end (10c) of said cylinder member (10a).

9. A spring device as set forth in claim 8, said biasing means (14) comprising a helical compression spring (14).

10. A spring device as set forth in claim 9, said helical compression spring (14) having an axial length smaller than the axial distance between said exit side end (10c) of said cylinder member (10a) and said ring member (12c), when said exit far end (10h) of said cylinder member (10a) is in abutting engagement with said bottom wall (12b) of said tube member (12).

11. A spring device as set forth in claim 8, said biasing means (114) comprising a volume of pressurized gas, said volume of pressurized gas being located radially between said piston rod member (110b) and said second section (112h) of said tube member (112) and being axially confined by first sealing ring means (112k) adjacent said exit side end (110c) of said cylinder member (110a) and by second sealing ring means (112c) connected to said second section (112h) of said tube member (112) and more remote from said cylinder member (110a), said piston rod member (110b) being sealingly guided through both said first (112k) and said second (112c) sealing ring means, said first sealing ring means (112k) being axially entrainable by said exit side end (110c) of said cylinder member (110a) towards said second sealing ring means (112c) against the biasing action of said volume of pressurized gas.

12. A spring device as set forth in claim 11, said first sealing ring means (112k) being axially locatable by axial locating means (112i) in a rest position, said first sealing ring means (112k), when being in said rest position, being axially spaced from said exit side end (110c) of said cylinder member (110a), when said cylinder member (110a) is in abutting engagement by its exit far end (110h) with said bottom wall (112b) of said tube member (112).

13. A spring device as set forth in claim 12, said second section (112h) of said tube member (112) having a diameter larger than said first section (112g) of said tube member (112), a shoulder-shaped transient section (112i) between said first section (112g) and said second section (112h) acting as said locating means.

14. A spring device as set forth in claim 11, said first sealing ring means (112k) being movable with respect to said second section (112h) against a larger frictional resistance than with respect to said piston rod member (110b).

15. A spring device as set forth in claim 1, said biasing means (214) being located substantially along the axial length of said cylinder member (210).

16. A spring device as set forth in claim 15, said slide member (212) being a tube member (212) having a circumferential wall (212a) surrounding said cylinder member (210a) and a bottom wall (212b) adjacent an exit far end (210h) of said cylinder member (210a), said biasing means (214) being located radially between said cylinder member (210a) and said circumferential wall (212a) of said tube member (212).

17. A spring device as set forth in claim 16, said biasing means (214) comprising a helical compression spring (214) axially supported by a first one of its ends through first annular support means (212m) connected said circumferential wall (212a) of said tube member (212) adjacent said exit side end (210c) of said cylinder member (210a) and by a second end through second annular support means (210n) connected with said cylinder member (210a) adjacent said exit far end thereof.

18. A spring device as set forth in claim 17, said tube member (212) being slidingly guided on said cylinder member (210a) by at least one of said first (212m) and said second (212n) annular support means.

19. A spring device as set forth in claim 1, in combination with a mechanical structure (15, 18, 20), said mechanical structure (15,18,20) comprising a basic structural unit (15) and a movable structural unit (18,20), which is connected to said basic structural unit (15), said movable structural unit (18,20) being movable along a path of movement (A,B) between a first terminal position (I) and a second terminal position (II) with respect to said basic structural unit (15), said movable structural unit (18,20) being subject to gravity forces within a first section (A) of said path of movement (A,B) nearer to said first terminal position (I) and within a second section (B) of said path of movement (A,B) nearer to said second terminal position (II) said gravity forces urging said movable structural unit (18,20) towards said first terminal position (I) within said first section (A) of said path of movement (A,B) and towards said second terminal position (II) within said second section (B) of said path (A,B) of movement, said spring device (11) being connected by its fastening elements (10i,12e) to both said basic structural unit (15) and said movable structural unit (18,20), said spring device supporting movement of said movable structural unit (20) away from said first terminal position (I) within said first section (A) against the action of said gravity forces, due to the expelling action of said pressurized fluid acting onto said piston rod member (10b), said spring device resisting said gravity forces within said second section (B) of said path (A,B) of movement through a biasing action of said biasing means (14).

20. A spring device as set forth in claim 19, said first section (A) and said second section (B) of said path (A,B) of movement being interconnected through a third section (C) of said path (A,C,B) of movement, movement of said movable structural unit (18,20) being substantially free of gravity forces within said third section (C), said spring device exerting substantially no spring forces onto said movable structural unit (18,20) during movement within said third section (C).

21. A spring device as set forth in claim 19, said basic structural unit (15) being a framework (15) of a motor-vehicle construction and said movable structural unit (18,20) being a roof unit (18,20) of said motor-vehicle construction.

22. A spring device comprising a fluid spring unit (10), said fluid spring unit (10) having a cylinder member (10a) with an axis, two ends (10c,10h) and a cavity (10d) within said cylinder member (10a), a piston rod member (10b) extending inwards and outwards of said cavity (10d) through an exit side end (10c) of said cylinder member (10a) along said axis, said piston rod member (10b) being axially movable with respect to said cylinder member (10a) between an innermost position and an outermost position with respect to said cylinder member (10a), a fluid under pressure within said cavity (10d), said fluid exerting an outwards directed expelling force onto said piston rod member (10b) with respect to said cylinder member (10a), said spring device further comprising a tube member (12), slidingly guided along said cylinder member (10a), said tube member (12) having a bottom wall (12b) adjacent an exit far end (10h) of said cylinder member (10a) and annular piston rod guiding means (12c) guidingly surrounding said piston rod member (10b) outside said cylinder member (10a), said cylinder member (10a) being axially movable within said tube member (12), biasing means (14) being provided within said tube member (12), said biasing means (14) biasing said cylinder member (10a) within said tube member (12) towards a terminal relative position of said cylinder member (10a) and said tube member (12).

* * * * *

UNITED STATES PATENT AND TRADEMARK OFFICE
CERTIFICATE OF CORRECTION

PATENT NO. : 5,248,131
DATED : September 28, 1993
INVENTOR(S) : Klaus-Dieter Jobelius It is certified that error appears in the above-identified patent and that said Letters Patent is hereby corrected as shown below:

Col. 1, line 5, "unit" should read --fluid spring unit--;
Col. 1, line 22, "load" should read --loaded--;
Col. 2, lines 44-45, delete "acting onto said piston rod member (10b), said spring";
Col. 9, line 48, "left" should read --$l_{eff}$--;
Col. 10, line 22, "leaset" should read --least--;
Col. 12, line 17, "connected" should read --connected to--.

Signed and Sealed this

Third Day of May, 1994

*Attest:*

BRUCE LEHMAN

*Attesting Officer*  *Commissioner of Patents and Trademarks*